(12) United States Patent
Peng et al.

(10) Patent No.: US 9,705,309 B2
(45) Date of Patent: Jul. 11, 2017

(54) TERMINAL PROTECTION METHOD, APPARATUS, AND ELECTRONIC DEVICE

(71) Applicant: Huawei Device Co., Ltd., Shenzhen (CN)

(72) Inventors: Xu Peng, Shenzhen (CN); Jianglin Gu, Shenzhen (CN); Feikuo Chiang, Shanghai (CN); Tian Liu, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 141 days.

(21) Appl. No.: 14/542,817

(22) Filed: Nov. 17, 2014

(65) Prior Publication Data
US 2015/0116871 A1 Apr. 30, 2015

Related U.S. Application Data

(63) Continuation of application No. PCT/CN2013/086048, filed on Oct. 28, 2013.

(51) Int. Cl.
*H02H 5/08* (2006.01)
*G06F 21/81* (2013.01)
(Continued)

(52) U.S. Cl.
CPC ............ *H02H 5/083* (2013.01); *G06F 21/81* (2013.01); *H05K 5/06* (2013.01); *G06F 1/26* (2013.01); *Y04S 40/24* (2013.01)

(58) Field of Classification Search
CPC ........... H02H 5/083; H05K 5/06; G06F 21/81
See application file for complete search history.

(56) References Cited

U.S. PATENT DOCUMENTS 5,624,237 A * 4/1997 Prescott .................. E03B 11/00
 361/25
5,823,921 A * 10/1998 Dawson ............... A63B 21/078
 482/104
(Continued)

FOREIGN PATENT DOCUMENTS

| CN | 101604836 A | 12/2009 |
| CN | 202309804 U | 7/2012 |
| CN | 102724335 A | 10/2012 |
| CN | 103196516 A | 7/2013 |
| CN | 203537431 U | 4/2014 |

(Continued)

OTHER PUBLICATIONS

Partial English Translation and Abstract of Chinese Patent Application No. CN202309804, Oct. 20, 2015, 7 pages.

(Continued)

*Primary Examiner* — Thienvu Tran
*Assistant Examiner* — Tien Mai
(74) *Attorney, Agent, or Firm* — Conley Rose, P.C.

(57) ABSTRACT

A terminal protection method that is applied to a terminal is provided. In the method, an air pressure change value collected by an air pressure sensor is obtained; the air pressure change value is compared with a preset air pressure change threshold; and when the air pressure change value exceeds the preset air pressure change threshold, a break instruction is generated, where the break instruction is used to break a power supply circuit of a mainboard circuit of the terminal. According to the terminal protection method provided in the present invention, the power supply circuit of the mainboard circuit of the terminal can be timely broken when the terminal falls into water, thereby solving a problem of a short circuit that occurs on the mainboard circuit of the terminal after the terminal falls into water.

17 Claims, 5 Drawing Sheets

(51) Int. Cl.
*H05K 5/06* (2006.01)
*G06F 1/26* (2006.01)

(56) References Cited

U.S. PATENT DOCUMENTS

| | | | | |
|---|---|---|---|---|
| 6,051,809 | A * | 4/2000 | Colella | B23K 9/1006 |
| | | | | 219/133 |
| 2003/0099549 | A1 * | 5/2003 | Shen | F04B 49/08 |
| | | | | 417/44.2 |
| 2005/0066437 | A1 * | 3/2005 | Cohen | A47K 3/022 |
| | | | | 4/622 |
| 2006/0104829 | A1 * | 5/2006 | Reed | F04B 43/0736 |
| | | | | 417/350 |
| 2007/0254697 | A1 | 11/2007 | Sugio et al. | |
| 2010/0164474 | A1 | 7/2010 | Oglesbee et al. | |
| 2010/0210325 | A1 | 8/2010 | Obata | |
| 2012/0188362 | A1 | 7/2012 | Takimoto et al. | |

FOREIGN PATENT DOCUMENTS

| | | |
|---|---|---|
| JP | 09197501 A | 7/1997 |
| JP | 2005311637 A | 11/2005 |
| JP | 2008199412 A | 8/2008 |
| JP | 2012085031 A | 4/2012 |
| WO | 2006028030 A1 | 3/2006 |
| WO | 2009041608 A1 | 4/2009 |
| WO | 2012122733 A1 | 9/2012 |

OTHER PUBLICATIONS

Foreign Communication From a Counterpart Application, Chinese Application No. 201380003047.7, Chinese Office Action dated Sep. 18, 2015, 11 pages.
Foreign Communication From a Counterpart Application, European Application No. 13876767.8, Extended European Search Report dated Jun. 15, 2015, 8 pages.
Partial English Translation and Abstract of Japanese Patent Application No. JPA2005311637, Mar. 9, 2016, 13 pages.
Partial English Translation and Abstract of Japanese Patent Application No. JPA2008199412, Mar. 9, 2016, 53 pages.
Partial English Translation and Abstract of Japanese Patent Application No. JPA2012085031, Mar. 9, 2016, 39 pages.
Partial English Translation and Abstract of Japanese Patent Application No. JPH09197501, Mar. 9, 2016, 23 pages.
Foreign Communication From a Counterpart Application, Japanese Application No. 2015544329, Japanese Office Action dated Dec. 18, 2015, 2 pages.
Foreign Communication From a Counterpart Application, Japanese Application No. 2015544329, English Translation of Japanese Office Action dated Dec. 18, 2015, 3 pages.
Partial English Translation and Abstract of Chinese Patent Application No. CN203537431A, Sep. 16, 2014, 12 pages.
Partial English Translation and Abstract of Chinese Patent Application No. CN102724335A, Sep. 16, 2014, 4 pages.
Partial English Translation and Abstract of Chinese Patent Application No. CN103196516A, Sep. 16, 2014, 5 pages.
Foreign Communication From a Counterpart Application, PCT Application No. PCT/CN2013/086048, International Search Report dated Jul. 17, 2014, 7 pages.
Foreign Communication From a Counterpart Application, PCT Application No. PCT/CN2013/086048, Written Opinion dated Jul. 17, 2014, 7 pages.

* cited by examiner

TERMINAL PROTECTION METHOD, APPARATUS, AND ELECTRONIC DEVICE

CROSS-REFERENCE TO RELATED APPLICATION

This application is a continuation of International Application No. PCT/CN2013/086048, filed on Oct. 28, 2013, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present application relates to the field of electronic terminal communications, and in particular, to a terminal protection method, apparatus, and electronic device.

BACKGROUND

With rapid development of science and technology, terminal devices such as mobile phones and tablet computers are applied widely. Users may use these terminal devices to conduct various activities, such as communication and entertainment.

In the process of studying the present invention, the inventor finds that an existing terminal device does not have a waterproof function, so that after the terminal device falls into water, a short circuit occurs on a mainboard circuit of the terminal device.

SUMMARY

In view of this, an objective of embodiments of the present invention is to provide a terminal protection method, apparatus, and electronic device, so as to solve a problem of a short circuit that occurs on a mainboard circuit of a terminal after the terminal falls into water.

To achieve the foregoing objective, the embodiments of the present invention provide the following technical solutions:

According to a first aspect of the embodiments of the present invention, a terminal protection method is provided, where the method is applied to a terminal, and the method includes: obtaining an air pressure change value collected by an air pressure sensor; comparing the air pressure change value with a preset air pressure change threshold; and when the air pressure change value exceeds the preset air pressure change threshold, generating a break instruction, where the break instruction is used to break a power supply circuit of a mainboard circuit of the terminal.

With reference to the first aspect, in a first possible implementation manner, the air pressure change value is generated when a waterproof membrane is deformed by water pressure, and the waterproof membrane is provided on a surface of an airtight enclosure.

With reference to the first possible implementation manner of the first aspect, in a second possible implementation manner, the air pressure sensor is provided inside the airtight enclosure.

With reference to the first aspect, the first possible implementation manner of the first aspect, or the second possible implementation manner of the first aspect, in a third possible implementation manner, that the break instruction is used to break a power supply circuit of a mainboard circuit of the terminal includes that: the break instruction is sent to an operating circuit of the mainboard circuit of the terminal, so as to trigger the operating circuit of the mainboard circuit to disconnect from the power supply circuit of the mainboard circuit.

With reference to the first aspect, the first possible implementation manner of the first aspect, or the second possible implementation manner of the first aspect, in a fourth possible implementation manner, that the break instruction is used to break a power supply circuit of a mainboard circuit of the terminal includes that the break instruction is sent to the power supply circuit of the mainboard circuit of the terminal, so as to trigger the power supply circuit of the mainboard circuit to disconnect from an operating circuit of the mainboard circuit.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner, the airtight enclosure is provided on a surface of the terminal or in a cavity inside the terminal.

According to a second aspect of the embodiments of the present invention, a terminal protection apparatus is provided, where the apparatus includes: an obtaining unit configured to obtain an air pressure change value collected by an air pressure sensor; a comparing unit configured to compare the air pressure change value with a preset air pressure change threshold; and a breaking unit configured to, when the air pressure change value exceeds the preset air pressure change threshold, generate a break instruction, where the break instruction is used to break a power supply circuit of a mainboard circuit of a terminal.

With reference to the second aspect, in a first possible implementation manner, the breaking unit includes a first sending subunit configured to send the break instruction to an operating circuit of the mainboard circuit of the terminal.

With reference to the second aspect, in a second possible implementation manner, the breaking unit includes a second sending subunit configured to send the break instruction to the power supply circuit of the mainboard circuit of the terminal.

According to a third aspect of the embodiments of the present invention, a terminal protection electronic device is provided, including an air pressure sensor and a processor, where the air pressure sensor is provided inside an airtight enclosure and is configured to collect an air pressure change value inside the airtight enclosure, where the air pressure change value is generated when a waterproof membrane on a surface of the airtight enclosure is deformed by water pressure, and where the processor is configured to obtain the air pressure change value collected by the air pressure sensor, compare the air pressure change value with a preset air pressure change threshold, and when the air pressure change value exceeds the preset air pressure change threshold, generate a break instruction, where the break instruction is used to break a power supply circuit of a mainboard circuit of the terminal.

With reference to the third aspect, in a first possible implementation manner, the processor is connected to the air pressure sensor by using a bus, and the air pressure sensor sends the collected air pressure change value to the processor by using the bus.

The present invention provides a terminal protection method, where the method is applied to a terminal, the terminal is provided with an air pressure sensor, and the air pressure sensor collects an air pressure change value in the terminal. In the terminal protection method provided in the present invention, an air pressure change value collected by the air pressure sensor is obtained; whether the terminal falls into water is determined by comparing the air pressure change value with a preset air pressure change threshold; when the air pressure change value exceeds the preset air pressure change threshold, it indicates that the terminal falls into water; and in this case, a break instruction is generated to break a power supply circuit of a mainboard circuit of the terminal, thereby preventing a short circuit caused by water flowing into the mainboard circuit after the terminal falls into water.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments recorded in the present application, and a person of ordinary skill in the art may still derive other drawings from these accompanying drawings without creative efforts.

DETAILED DESCRIPTION

To make a person skilled in the art understand the solutions in the present application better, the following clearly describes the technical solutions in the embodiments of the present invention with reference to the accompanying drawings in the embodiments of the present invention. The described embodiments are merely a part rather than all of the embodiments of the present application. All other embodiments obtained by a person of ordinary skill in the art based on the embodiments of the present application without creative efforts shall fall within the protection scope of the present application.

Figure 1:
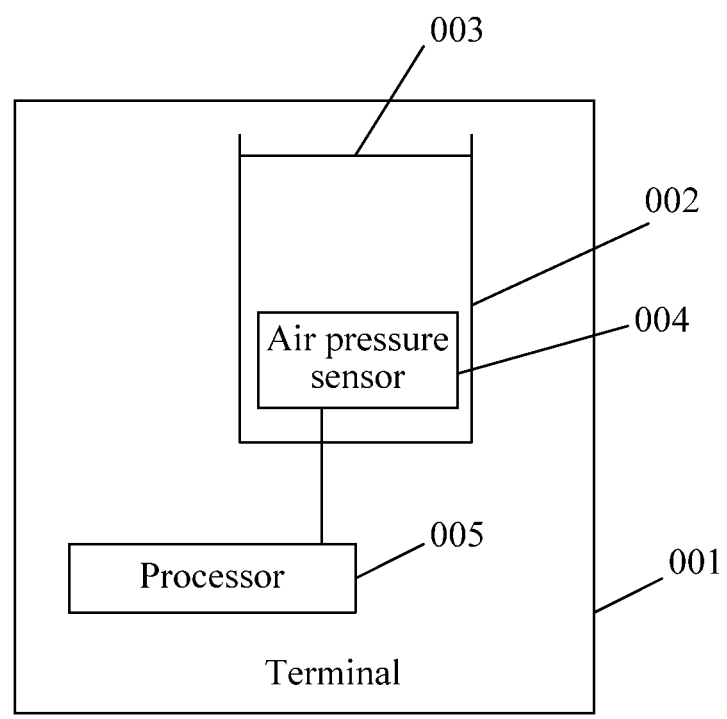
FIG. 1 is a schematic structural diagram of a terminal according to an embodiment of the present invention.

An embodiment of the present invention provides a terminal protection method, where the method is applied to a terminal, and the terminal may be a terminal device, such as a mobile phone or a tablet computer. FIG. 1 is a schematic structural diagram of the terminal according to the embodiment of the present invention. A terminal 001 is provided with an airtight enclosure 002, where the airtight enclosure 002 may be provided on a surface of the terminal 001 or in a cavity inside the terminal 001. FIG. 1 shows that the airtight enclosure 002 is provided in the cavity inside the terminal 001. A surface of the airtight enclosure 002 is provided with a waterproof membrane 003, where the waterproof membrane 003 forms a part of an enclosure wall of the airtight enclosure 002. An air pressure sensor 004 is provided inside the airtight enclosure 002, and is configured to collect an air pressure change value inside the airtight enclosure 002. The air pressure sensor 004 is connected to a processor 005 in the terminal 001 by using a bus.

Figure 2:
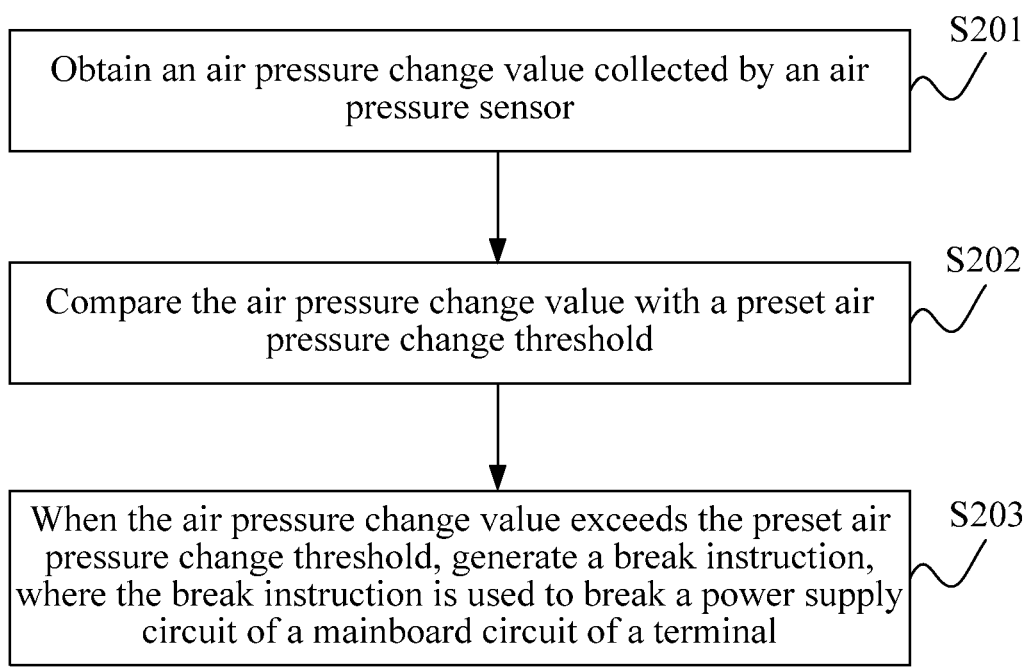
FIG. 2 is a flowchart of a terminal protection method according to an embodiment of the present invention.

FIG. 2 is a flowchart of a terminal protection method according to an embodiment of the present invention. As shown in FIG. 2, the method includes:

Step S201: Obtain an air pressure change value collected by an air pressure sensor.

In the terminal protection method provided in the embodiment of the present invention, when a terminal falls into water, a waterproof membrane on a surface of an airtight enclosure is deformed by water pressure and moves toward the inside of the airtight enclosure, so that space inside the airtight enclosure decreases, resulting in an air pressure change. An air pressure sensor provided inside the airtight enclosure collects an air pressure change value inside the airtight enclosure, and sends the collected air pressure change value to a processor by using a bus connected to the processor.

Step S202: Compare the air pressure change value with a preset air pressure change threshold.

In the terminal protection method provided in the embodiment of the present invention, after the air pressure change value collected by the air pressure sensor is obtained, the obtained air pressure change value is compared with the preset air pressure change threshold.

The air pressure change threshold may be preset by means of factory settings when the terminal is delivered. An available value range of the air pressure change value may also be provided for a user, so that the user performs settings.

In another embodiment of the present invention, when the terminal falls into water, due to various external factors, for example, a height from which the terminal falls into water, and an angle at which the terminal enters water when the terminal falls into water, the air pressure change value inside the airtight enclosure collected by the air pressure sensor may be different at a moment when the terminal enters water. In the embodiment of the present invention, a plurality of tests is performed on the terminal falling into water, so that a plurality of air pressure change values is obtained when the terminal falls into water based on different factors, and a minimum air pressure change value $\Delta a$ is selected from the plurality of air pressure change values, so as to obtain an air pressure change interval $[0, \Delta a)$.

In the embodiment of the present invention, an air pressure value may be randomly selected from the interval $[0, \Delta a)$ and used as the preset air pressure change threshold.

In the embodiment of the present invention, the air pressure change value inside the airtight enclosure is generated when the waterproof membrane is deformed by water pressure. The following uses an example to describe how to detect the air pressure change value according to the deformation of the waterproof membrane.

In a state in which the terminal provided with the airtight enclosure does not fall into water, an initial value of air pressure inside the airtight enclosure is an atmospheric pressure value a1.

After the terminal provided with the airtight enclosure falls into water, a value of the air pressure inside the airtight enclosure is a2; therefore an air pressure change value inside the airtight enclosure is a2-a1 when the terminal falls into water.

After the air pressure change value a2-a1 and the preset air pressure change threshold are obtained, the air pressure change value is compared with the preset air pressure change threshold.

Step S203: When the air pressure change value exceeds the preset air pressure change threshold, generate a break instruction, where the break instruction is used to break a power supply circuit of a mainboard circuit of the terminal.

In the embodiment of the present invention, after the break instruction is generated when it is learned by comparison that the air pressure change value exceeds the preset air pressure change threshold, the break instruction may be sent to an operating circuit of the mainboard circuit of the terminal, so as to trigger the operating circuit of the mainboard circuit to disconnect from the power supply circuit of the mainboard circuit; and the break instruction may also be sent to the power supply circuit of the mainboard circuit of the terminal, so as to trigger the power supply circuit to disconnect from the operating circuit of the mainboard circuit. In this way, it is ensured that the mainboard circuit of the terminal is timely powered off when the terminal falls into water, thereby preventing a short circuit caused by water flowing into a mainboard circuit of the terminal because the terminal falls into water.

Figure 3:
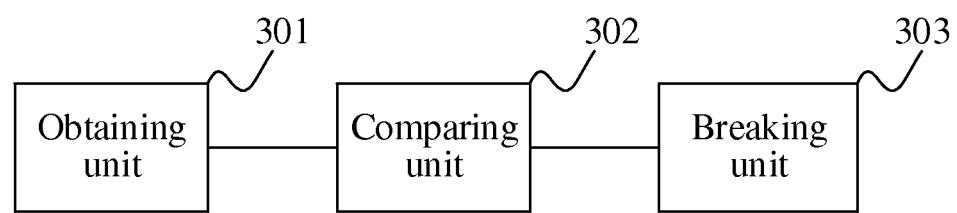
FIG. 3 is a schematic structural diagram of a terminal protection apparatus according to an embodiment of the present invention.

Based on the method embodiment in FIG. 2, an embodiment of the present invention further provides a terminal protection apparatus, where the apparatus may be a terminal device, such as a mobile phone or a tablet computer. A schematic structural diagram of the apparatus is shown in FIG. 3. The apparatus includes: an obtaining unit 301 configured to obtain an air pressure change value collected by an air pressure sensor; a comparing unit 302 configured to compare the air pressure change value with a preset air pressure change threshold; and a breaking unit 303 configured to, when the air pressure change value exceeds the preset air pressure change threshold, generate a break instruction, where the break instruction is used to break a power supply circuit of a mainboard circuit of a terminal.

In the terminal protection apparatus in the embodiment of the present invention, the obtaining unit 301 obtains the air pressure change value collected by the air pressure sensor; the comparing unit 302 compares the air pressure change value with the preset air pressure change threshold and sends a comparison result to the breaking unit 303; and the breaking unit 303 generates the break instruction when the air pressure change value exceeds the preset air pressure change threshold, where the break instruction is used to break the power supply circuit of the mainboard circuit of the terminal, thereby preventing a short circuit caused by water flowing into the mainboard circuit when the terminal falls into water.

Figure 4:
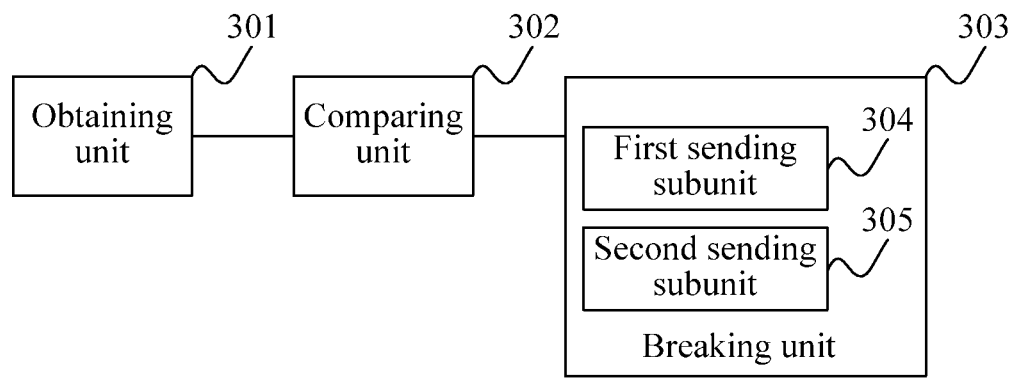
FIG. 4 is a schematic structural diagram of a terminal protection apparatus according to another embodiment of the present invention.

Another schematic structural diagram of a terminal protection apparatus provided in an embodiment of the present invention is shown in FIG. 4. The breaking unit 303 includes a first sending subunit 304 configured to send the break instruction to an operating circuit of the mainboard circuit of the terminal. The breaking unit 303 may further include a second sending subunit 305 configured to send the break instruction to the power supply circuit of the mainboard circuit of the terminal.

In the terminal protection apparatus provided in the embodiment of the present invention, after the break instruction is generated, the breaking unit 303 may send the break instruction to the operating circuit of the mainboard circuit of the terminal by using the first sending subunit 304, so as to trigger the operating circuit of the mainboard circuit to disconnect from the power supply circuit of the mainboard circuit; or the breaking unit 303 may send the break instruction to the power supply circuit of the mainboard circuit of the terminal by using the second sending subunit 305, so as to trigger the power supply circuit to disconnect from the operating circuit of the mainboard circuit. In this way, it is ensured that the mainboard circuit of the terminal is timely powered off when the terminal falls into water, thereby preventing a short circuit caused by water flowing into a mainboard circuit of the terminal because the terminal falls into water.

Figure 5:
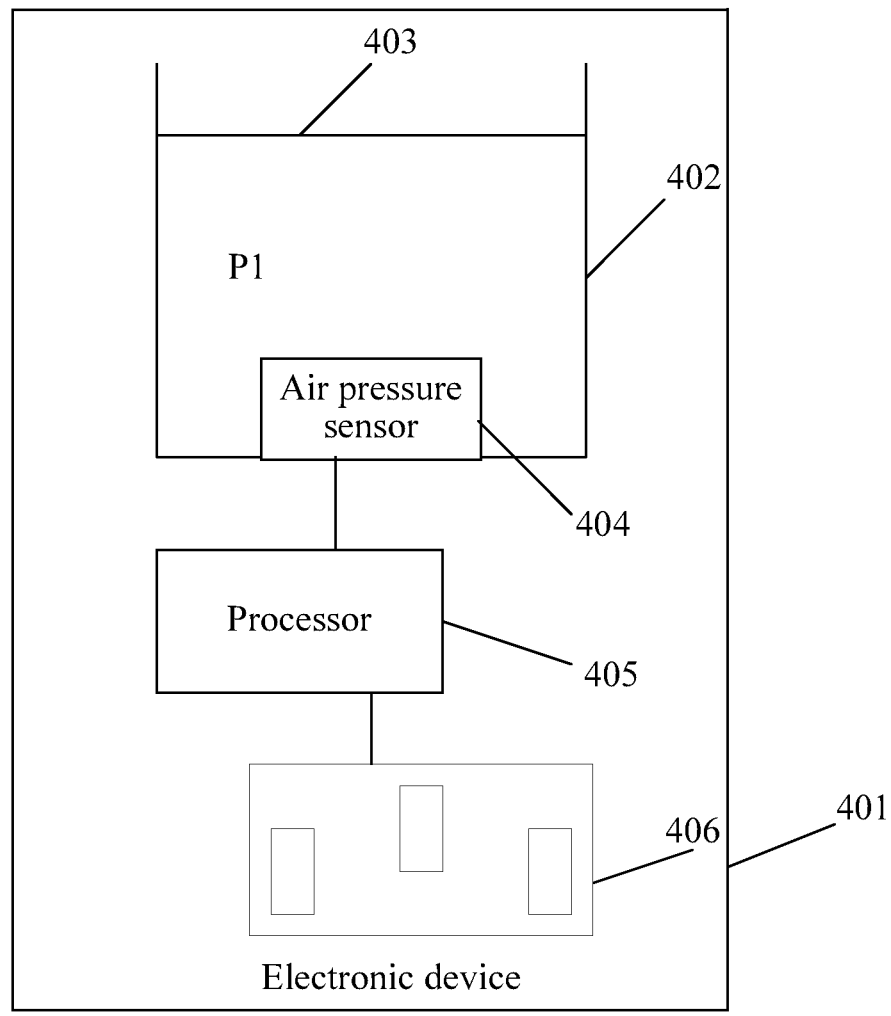
FIG. 5 is a schematic structural diagram of a terminal protection electronic device according to an embodiment of the present invention.

An embodiment of the present invention further provides a terminal protection electronic device, where the electronic device may be a terminal device, such as a mobile phone or a tablet computer. A schematic structural diagram of an electronic device 401 is shown in FIG. 5. The electronic device 401 includes an air pressure sensor 404 and a processor 405.

The air pressure sensor 404 is provided inside an airtight enclosure 402, and a surface of the airtight enclosure 402 is provided with a waterproof membrane 403.

The air pressure sensor 404 is configured to collect an air pressure change value inside the airtight enclosure 402, where the air pressure change value is generated when the waterproof membrane 403 is deformed by water pressure.

The processor 405 is configured to: obtain the air pressure change value collected by the air pressure sensor 404; compare the air pressure change value with a preset air pressure change threshold; and when the air pressure change value exceeds the preset air pressure change threshold, generate a break instruction, where the break instruction is used to break a power supply circuit of a mainboard circuit 406 of a terminal.

Figure 6:
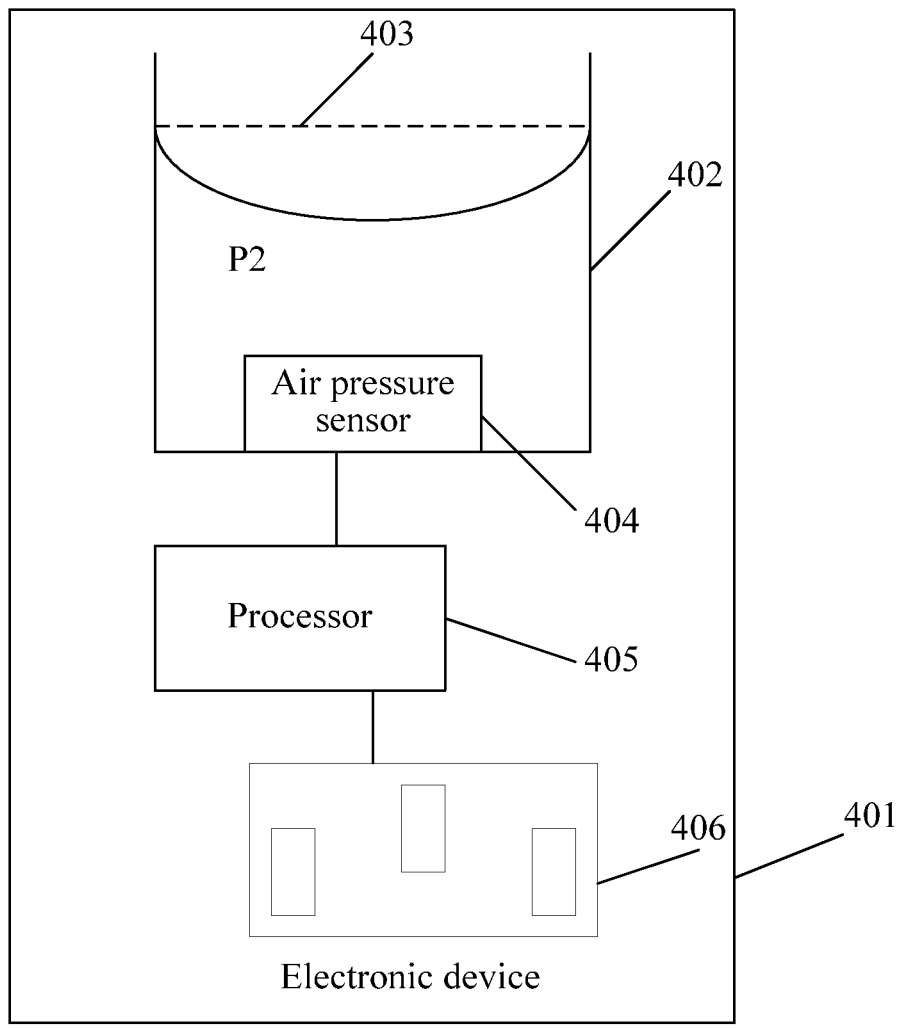
FIG. 6 is another schematic structural diagram of a terminal protection electronic device according to an embodiment of the present invention.

FIG. 5 is a schematic structural diagram of a terminal, before the terminal falls into water, according to an embodiment of the present invention. FIG. 6 is a schematic structural diagram of a terminal, after the terminal falls into water, according to an embodiment of the present invention. As shown in FIG. 5 and FIG. 6, the electronic device 401 includes: the airtight enclosure 402, the waterproof membrane 403, the air pressure sensor 404, the processor 405, and the mainboard circuit 406.

Before the electronic device 401 falls into water, an initial value of air pressure inside the airtight enclosure 402 is P1, where P1 may be an atmospheric pressure value. As shown in FIG. 6, when the electronic device 401 falls into water, the waterproof membrane 403 moves, under water pressure, downward from a dashed line position to a solid line position in FIG. 6. As a result, a volume inside the airtight enclosure 402 decreases, so that the value of the air pressure inside the airtight enclosure 402 increases to P2. The air pressure sensor 404 provided inside the airtight enclosure 402 collects an air pressure change value $\Delta P = P2 - P1$ inside the airtight enclosure 402.

The processor 405 obtains the air pressure change value $\Delta P$, compares $\Delta P$ with the preset air pressure change threshold, and when $\Delta P$ is greater than the preset air pressure change threshold, generates the break instruction to break the power supply circuit of the mainboard circuit 406 of the terminal.

In the embodiment of the present invention, the airtight enclosure 402 may be provided on a surface of the electronic device 401 or in a cavity inside the electronic device 401.

In the terminal provided in the embodiment of the present invention, the processor 405 may be connected to the air pressure sensor 404 by using a bus, and the air pressure sensor 404 sends a collected air pressure change value to the processor 405 by using the bus; the processor 405 may also be connected to the air pressure sensor 404 by means of wireless connection, for example, the air pressure sensor 404 and the processor 405 may be connected to a Bluetooth® module in the terminal, and the air pressure change value collected by the air pressure sensor 404 is transmitted in a wireless manner by using the Bluetooth® module. A specific implementation manner is not specifically limited in the embodiment of the present invention.

The embodiments in this specification are all described in a progressive manner, for same or similar parts in the embodiments, reference may be made to these embodiments, and each embodiment focuses on a difference from other embodiments. The foregoing descriptions are merely specific implementation manners of the present application. It should be noted that a person of ordinary skill in the art may make several improvements and polishing without departing from the principle of the present application and the improvements and polishing shall fall within the protection scope of the present application.

What is claimed is:

1. A terminal protection method applied to a terminal, comprising:
    obtaining an air pressure change value collected by an air pressure sensor;
    comparing the air pressure change value with a preset air pressure change threshold; and
    generating a break instruction when the air pressure change value exceeds the preset air pressure change threshold,
    wherein the break instruction is used to break a power supply circuit of a mainboard circuit of the terminal,
    wherein the air pressure sensor is provided inside an airtight enclosure within the terminal,
    wherein the airtight enclosure is provided in a cavity inside the terminal, and
    wherein the air pressure change value is a difference between a first value of air pressure inside the airtight enclosure before the terminal falls into water and a second value of air pressure inside the airtight enclosure after the terminal falls into the water.

2. The method according to claim 1, wherein the air pressure change value is generated when a waterproof membrane is deformed by water pressure, and wherein the waterproof membrane is provided on a surface of the airtight enclosure.

3. The method according to claim 1, wherein the break instruction is sent to an operating circuit of the mainboard circuit of the terminal to trigger the operating circuit of the mainboard circuit to disconnect from the power supply circuit of the mainboard circuit.

4. The method according to claim 1, wherein the break instruction is used to break the power supply circuit of the mainboard circuit of the terminal comprises the break instruction being sent to the power supply circuit of the mainboard circuit of the terminal to trigger the power supply circuit of the mainboard circuit to disconnect from an operating circuit of the mainboard circuit.

5. The method according to claim 1, further comprising:
    obtaining a plurality of air pressure change values collected by the air pressure sensor;
    selecting a minimum air pressure change value from the air pressure change values to obtain an air pressure change interval; and
    selecting one of the air pressure change values in the air pressure change interval to be the preset air pressure change threshold.

6. A terminal protection apparatus, comprising:
    a processor configured to:
        obtain an air pressure change value collected by an air pressure sensor;
        compare the air pressure change value with a preset air pressure change threshold; and
        generate a break instruction when the air pressure change value exceeds the preset air pressure change threshold,
    wherein the break instruction is used to break a power supply circuit of a mainboard circuit of a terminal,
    wherein the air pressure sensor is provided inside an airtight enclosure within the terminal, and
    wherein the airtight enclosure is provided in a cavity inside a terminal.

7. The terminal protection apparatus according to claim 6, further comprising a transmitter coupled to the processor and configured to send the break instruction to an operating circuit of the mainboard circuit of the terminal.

8. The terminal protection apparatus according to claim 6, further comprising a transmitter coupled to the processor and configured to send the break instruction to the power supply circuit of the mainboard circuit of the terminal.

9. The terminal protection apparatus according to claim 6, wherein the processor is coupled to the air pressure sensor via a bus, and wherein the processor receives the air pressure change value via the bus.

10. The terminal protection apparatus according to claim 6, wherein the processor is coupled to the air pressure sensor via a Bluetooth® connection, and wherein the processor receives the air pressure change value using the Bluetooth® connection.

11. The terminal protection apparatus according to claim 6, wherein the preset air pressure change threshold is preset by factor settings of the terminal.

12. The terminal protection apparatus according to claim 6, wherein the preset air pressure change threshold is selected from a plurality of air pressure change values obtained when the terminal falls into water.

13. A terminal protection electronic device, comprising:
    an air pressure sensor provided inside an airtight enclosure and configured to collect an air pressure change value inside the airtight enclosure, wherein the airtight enclosure is provided in a cavity inside a terminal, and wherein the air pressure change value is generated when a waterproof membrane on a surface of the airtight enclosure is deformed by water pressure; and
    a processor coupled to the air pressure sensor and configured to:
        obtain the air pressure change value collected by the air pressure sensor;
        compare the air pressure change value with a preset air pressure change threshold, and generate a break instruction when the air pressure change value exceeds the preset air pressure change threshold; and
        generate a break instruction, wherein the break instruction is used to break a power supply circuit of a mainboard circuit of a terminal.

14. The terminal protection electronic device according to claim 13, wherein the processor is connected to the air pressure sensor using a bus, and wherein the air pressure sensor sends the collected air pressure change value to the processor using the bus.

15. The terminal protection electronic device according to claim 13, wherein the preset air pressure change threshold is preset by factor settings of the terminal.

16. The terminal protection electronic device according to claim 13, wherein the preset air pressure change threshold is selected from a plurality of air pressure change values obtained when the terminal falls into water.

17. The terminal protection electronic device according to claim 13, wherein the terminal is a mobile device.

\* \* \* \* \*